United States Patent [19]

Yang

[11] Patent Number: 5,449,959
[45] Date of Patent: * Sep. 12, 1995

[54] SOLAR BATTERY CONTROL SWITCH OUTPUT VOLTAGE ADJUSTMENT CIRCUIT

[76] Inventor: Tai-Her Yang, 5-1 Taipin St., Si-Hu Town, Dzan-Hwa, Taiwan

[ * ] Notice: The portion of the term of this patent subsequent to Oct. 4, 2011 has been disclaimed.

[21] Appl. No.: 32,131

[22] Filed: Mar. 17, 1993

[30] Foreign Application Priority Data

Mar. 18, 1992 [GB] United Kingdom ............... 9205862

[51] Int. Cl.6 .............................................. H02J 1/00
[52] U.S. Cl. ........................................ 307/81; 307/63; 307/77; 323/906
[58] Field of Search ................... 307/43, 54, 61, 63, 307/77, 80, 81, 85; 323/283, 906; 363/65, 71

[56] References Cited
U.S. PATENT DOCUMENTS 3,487,229 12/1969 Krauz ..................... 307/71
4,175,249 11/1979 Gruber .................... 323/15
4,412,137 10/1983 Hansen et al. ............ 307/10 R
4,649,287 3/1987 Nola ....................... 307/31
4,742,243 5/1988 Zabar et al. .............. 307/81
5,045,990 9/1991 Stanley .................... 363/43
5,121,046 6/1992 McCullough .............. 320/16
5,187,396 2/1993 Armstrong, II et al. ..... 307/494
5,352,931 10/1994 Yang ....................... 307/81

Primary Examiner—Steven L. Stephan
Assistant Examiner—Adolf Berhane
Attorney, Agent, or Firm—Leonard Bloom

[57] ABSTRACT

The present invention is to provide an effective newly designed circuit which can output graded multi-voltage, and further combine with linear or chopped solid switch member so as to attain series and parallel switch to adjust its output value when the voltage changes because of accepting solar quality changes or attain the non-sparkle multi-voltage switching and low ripple-wave PWM voltage output of graded linear or chopped wave and further feedback the limited current or set voltage output adjustment function.

3 Claims, 7 Drawing Sheets

SOLAR BATTERY CONTROL SWITCH OUTPUT VOLTAGE ADJUSTMENT CIRCUIT

SUMMARY OF THE INVENTION

Solar battery is portable and pocket, so it is widely used for various appliances. However, it has its own physical feature of transforming basic solar energy into electric power. Generally speaking, we shall choose its voltage and capacity by means of its multiple series and supply it in accordance with the need of load by means of graded voltage, or control it by serial linear members, or operate it by chopped wave switches. This is an efficient circuit design mainly to provide the Solar Battery Control Switch Output Voltage Adjustment Circuit and further to connect with linear or chopped wave solid switch members so as to attain non-sparkle multi-voltage switching and graded voltage combining with linear voltage adjustment, or low ripple-wave PWM voltage output of graded voltage combining with chopped wave voltage adjustment. And "by means of linear adjustment or solid switch member of PWM adjusting control which is disposed serially in solar battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output or the slowly voltage-rising or slowly voltage-dropping output which forms between valley bottom voltage and peak and is controlled by adjustable linear, or PWM of it", and outputs the adjusting function by means of further feedback of limited currenct, or constant current and set voltage.

DETAILED DESCRIPTION OF THE INVENTION

Figure 1:
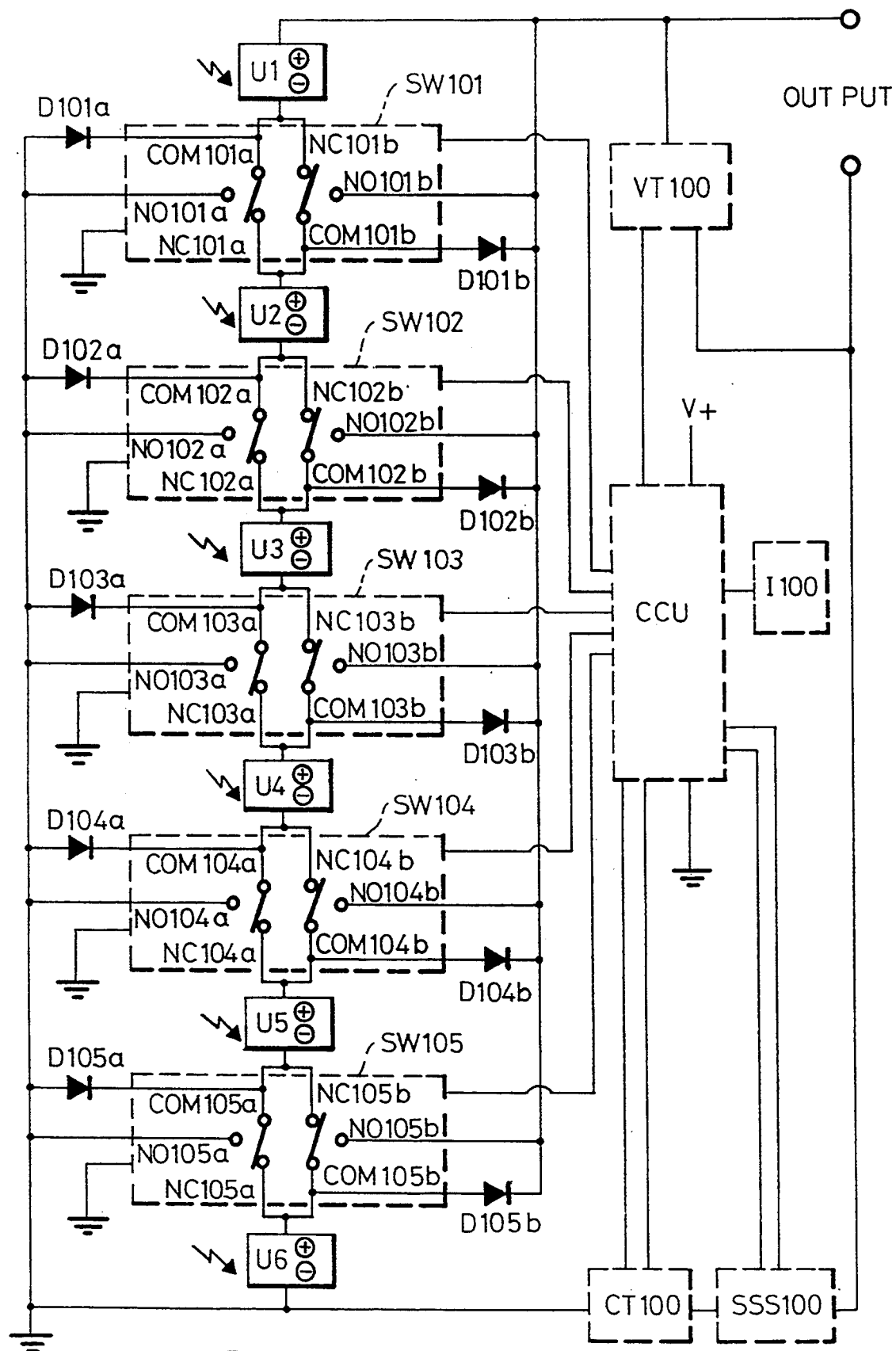
FIG. 1 is a view of two-knife and two-throw switch multiple series diode for solar battery multi-voltage switch according to an embodiment of the invention.

Now referring to FIG. 1, a view of an embodiment of Solar Battery Control Switch Output Voltage Adjustment Circuit, by means of battery and serial two-throw (C) contact switch, it forms a multi-voltage output composed of alternative switch, and when outputting, it will make switch contact multiple series connect to segmented diode's two ends so as to eliminate diode's direct voltage reducing and thermal loss, and it can further combine with current inspection device and linear or switch-mode solid switch member, and combine with a central control unit (CCU) to accept operation order of input device instruction so as to control electric-mechanical switch and solid switch member for adjusting output voltage current flow or adjusting the output constant voltage, or set the limits of output current value, or constant current and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/negative polar on/off switch of output side.

The structure and operation of the embodiment are disclosed as follows:

two sets or more than two sets of solar battery units of same voltage, same capacity, or at least of same voltage, by means of more than two-knife manual two-throw switch, or drum switch, or electric-mechanical switch members, such as magnetic or mechanical operated relay, etc., which are disposed between battery units and tends to be in direct-polar series with battery, said battery includes a single or multiple series, or multipled, or multipled series to be a solar battery unit; common contacts of two sets of different knife of two-knife switch are in replacement series with the open contact; that is, the common contact of knife A is connected to close contact of knife B, and the common contact of knife B is connected to close contact of knife A; and each connected contact is respectively connected to positive and negative pole of solar battery unit; each common contact of switch is connected to the positive pole of the knife unit, and its common contact is in direct multipled series with diode and connects to its open contact and further to the first battery unity and output positive end; common contact of each switch is connected to the negative end of knife unit, its common contact and open contact are in direct series with diode, and is connected from open contact to the negative pole of the last solar battery and outputs negative end; said electric-mechanical switch member can be composed of directly manual switch, or magnetic driven, or driven by other mechanism.

Said systematic operation has the following function and advantages:

1. According to the common divisor symmetric to on/off switch, added to wholly open or wholly close contacts, it can provide multiple choices for multi-voltage output of series and parallel state so as to provide choices of output solar quantity and positively switch the adjustment for series and parallel states when unit battery voltage is changed on account of the change of accepting solar quantity.

2. When output, all multiple contacts of diode are tended to close so that they can eliminate direct pressure drop and thermal loss of diode.
3. When turned on/off, diode provides linear graded voltage for lessening switch voltage, and used as transient current path to prolong the life of switch contact.

Take the embodiment in FIG. 1 for example, composed of switch SW101–SW105 between six sets of battery units U1–U6 and five intermingled battery units, each switch has diode D101a–105a according to said principle, its input end multiples to pass negative output end; D101b–105b output end multiples to pass positive output end; when common contact and close contact of operating switch SW101–105 are tended to close, all battery units are multipled and in series with output voltage which is 6×EB; that is, every three sets of battery units tend to be serialized and then multiplized; when SW102 and SW104 are controlled to be common contact and be converted to connect with open contact, output voltage will be 2×EB; that is, every two battery units are serialized and then multiplized; when switch SW101–SW105 are controlled to be common contact and be converted to connect with open contact, output voltage will be EB; that is, battery unit U1–U6 are multiplized. If we use 24 sets of voltage to construct for battery units, we get multi-voltage grades of 1×EB, 2×EB, 3×EB, 4×EB, 6×EB, 8×EB, 12×EB, 24×EB; If we use 36 sets of voltage unit, we get 1×EB, 2×EB, 3×EB, 4×EB, 6×EB, 9×EB, 12×EB, 18×EB, 36×EB, all the graded multi-voltage output is formed by battery unit multiple value according to the common divisor of battery units, others are analog of this example and need not to be mentioned here. Said switch unit can be manual, or be controlled by a central control unit (CCU) and input unit I100 so as to control said switch unit to turn multi-voltage on/off; or to further serialize linear or switch open solid switch member SSS 100 at the output terminal so as to adjust and control the electric-mechanical switch operation situation and solid switch work situation which is relative to input value. When accepted solar quantity is changed, by means of detecting output voltage controlled by CCU in the series and parallel states so as to adjust the output voltage.

We can further serialize an inspection device CT100 to the output circuit so as to inspect its output current value feeding back to central control unit (CCU), according to the input unit instruction or the preset value in CPU, and control mutually and relatively electric-mechanical switch and solid switch, and at the output terminal it multiplized inspection device VT100 so as to inspect its output voltage value which feeds back too CCU, and in accordance with instructions of input unit, or with the mutual control of solid switch and electric-mechanical switch of preset value in CCU. Similar to the conventional steady voltage circuit, because this circuit has a standard potential, in addition to adjusting the voltage change caused by unsteady load, it can adjust loaded side voltage change caused by unsteady power voltage. Also it can adjust the loaded bias voltage variety resulted from the unstability of the accepted solar quantity of individual battery.

Besides, the most important thing is that by means of the following controlled order, we may achieve the following functions: when switching electric-mechanic switch, at the "on" position, solid switch (on) operation time suspends after the electric-mechanic switch, at the "off" position, solid switch (off) operation time precedes electric-mechanic switch to turn the power off so as to attain non-sparkle on/off electric-mechanic switch, this switch further includes non-sparkle switching of positive and negative polar on/off switch of output side.

Said set operation order includes mode of manual, electric magnetic, mechanic, and flow control, according to said switch operation order, it may be locked up or delayed by mechanic order, or order locked up or delayed by circuit.

Figure 2:
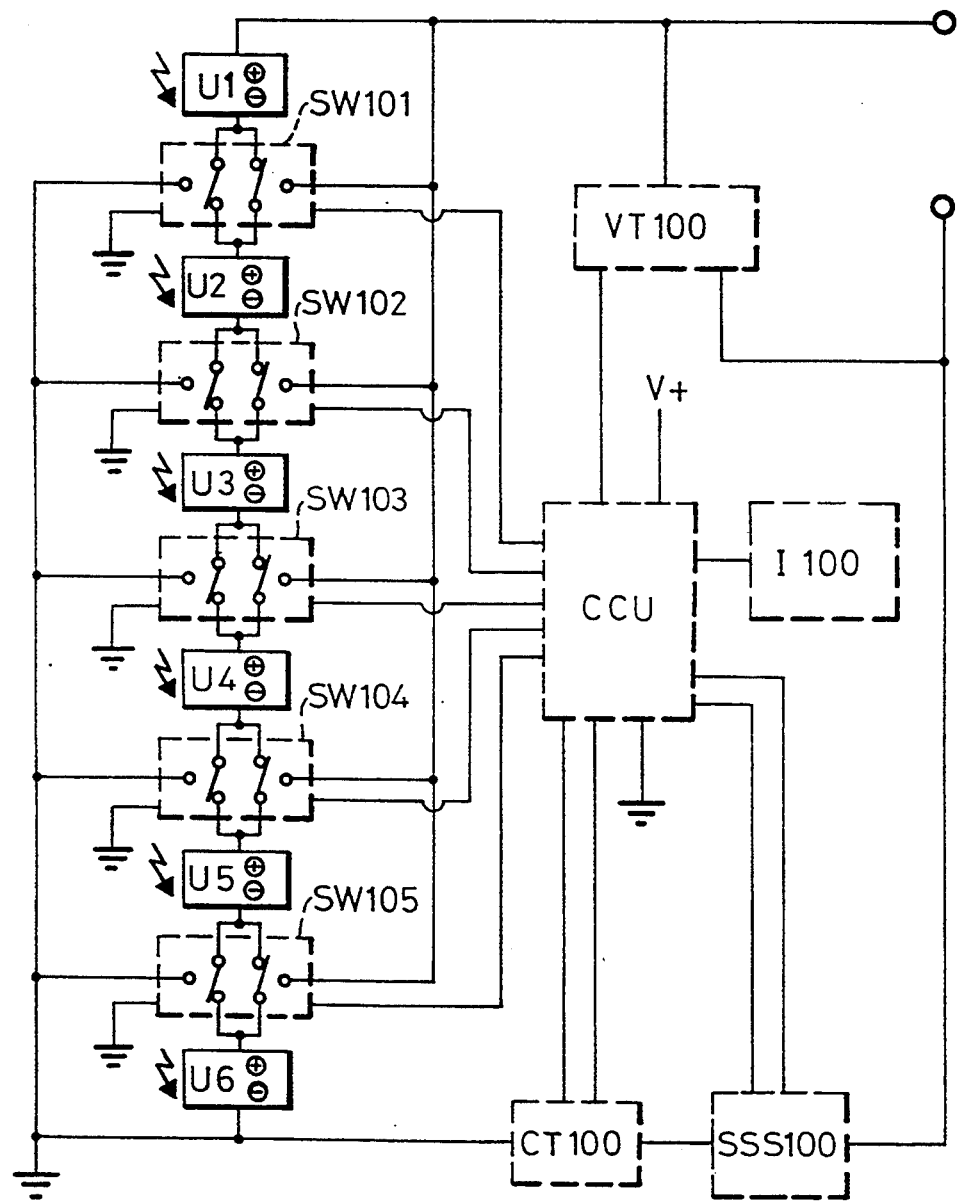
FIG. 2 is a view of solar battery multi-voltage switch circuit of two-knife and two-throw switch.

This kind of circuit, when put into practical uses, if power capacity is lower, diode can be omitted, too, and two-knife two and two-throw switch can directly turn on/off other function. The same as the embodiment in FIG. 1, when using, it can further connect to solid switch member and output voltage current inspection member and by means of input unit and central control unit CCU, it has various function. FIG. 2 is a view of solar battery multi-voltage control circuit of two-knife and two-throw switch.

Figure 3:
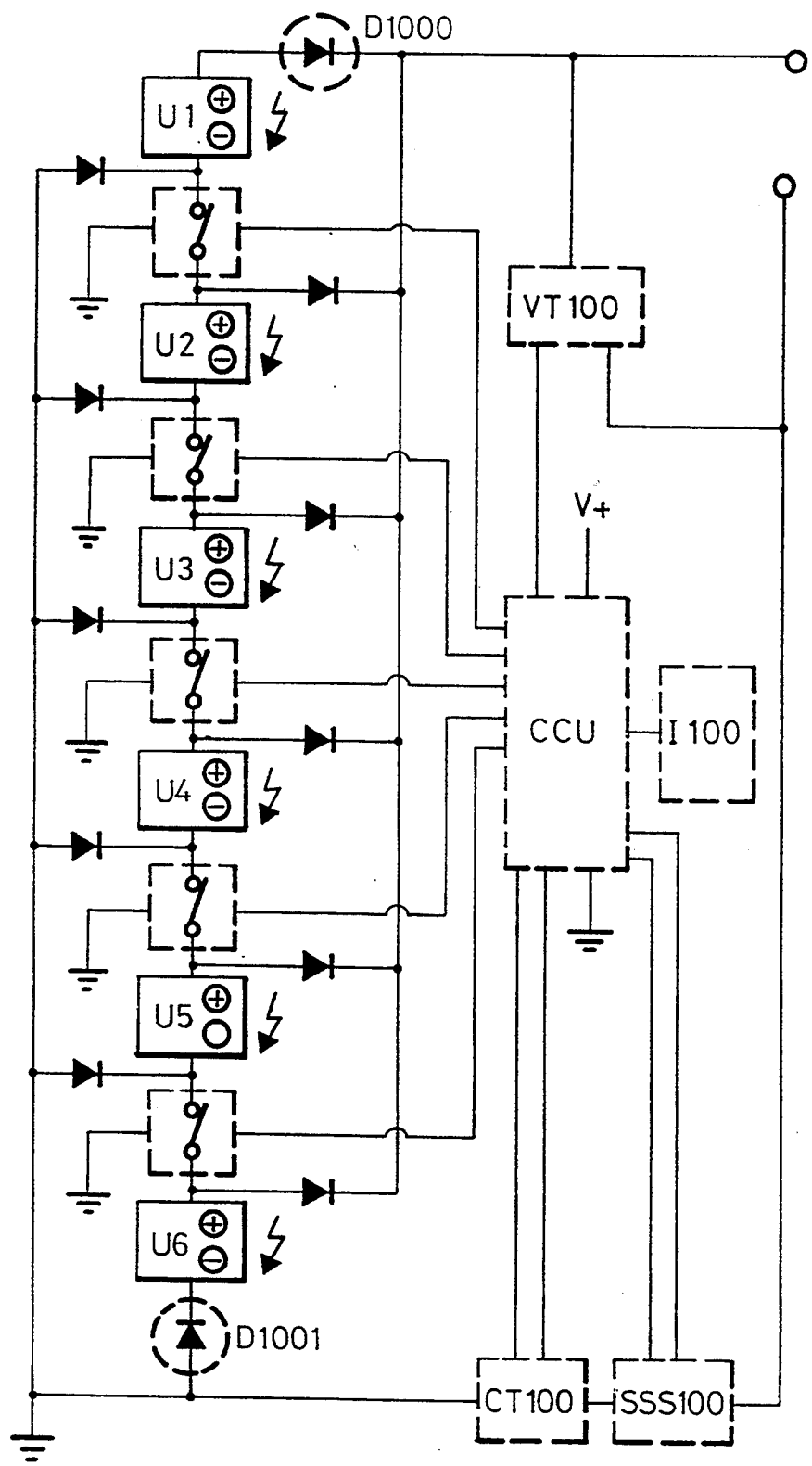
FIG. 3 is a view of solar battery multi-voltage switch circuit of single-knife switch.

If circuit efficiency is available and application is limited by space, we can connect single-knife single-throw switch to diode so as to produce on/off switching multi-voltage output function, in application we can further connect solid switch member and output voltage current inspection member and by means of input unit, CCU produces various same function. FIG. 3 is a view of solar battery multi-voltage switch circuit of single-knife switch. In FIG. 3, D1000 and D1001 are diodes for average pressure used to provide battery multipled for average voltage, can be disposed on it when needed.

Figure 4:
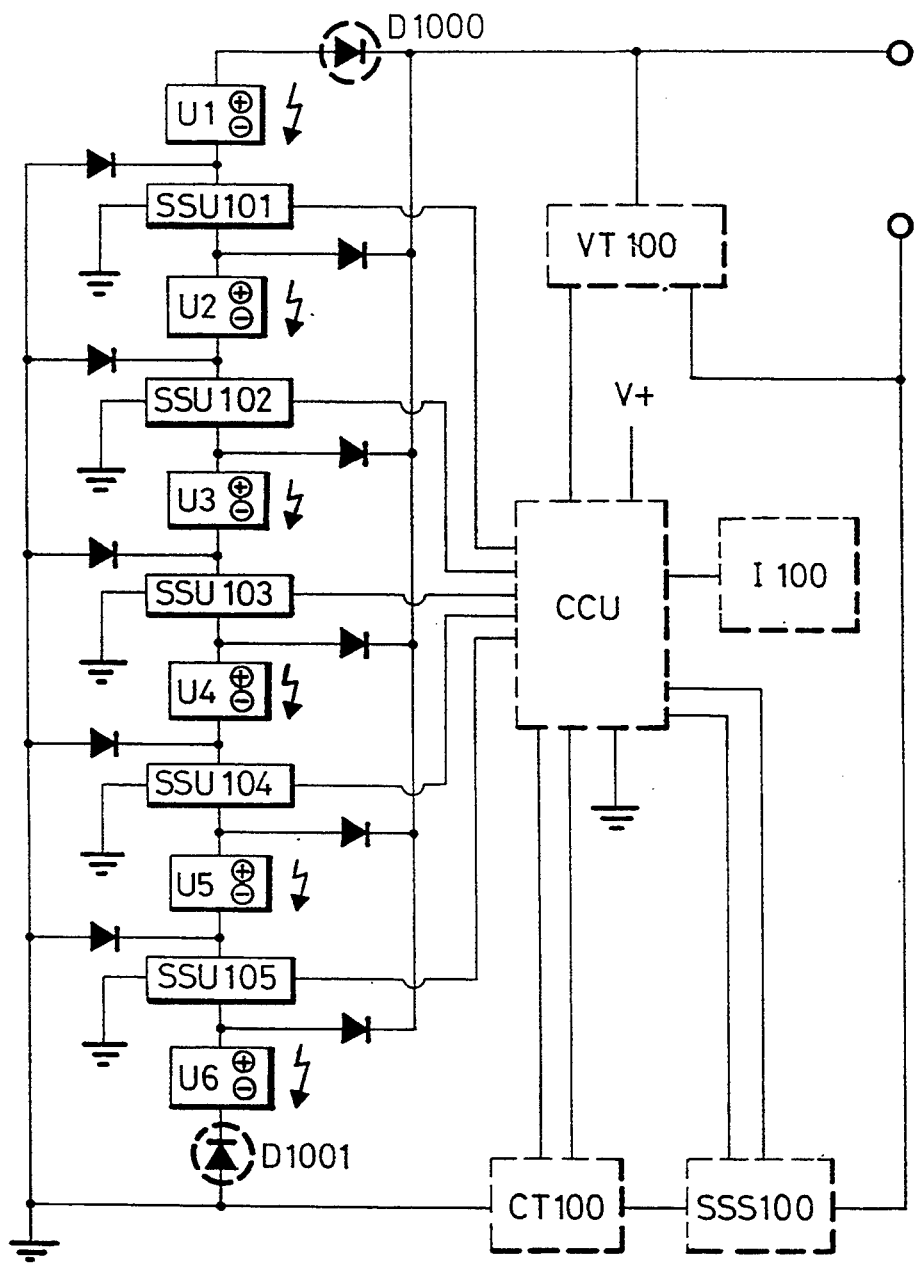
FIG. 4 is a view of solar battery multi-voltage switch composed of solid switch and diode.

Moreover, electric-mechanic switch serialized between voltage units in said circuit can be replaced by solid switch member, and connect to diode so as to form multi-voltage output. Referring to FIG. 4, in this circuit its switching function is the same as that of FIG. 3, in FIG. 4, D1000 and D1001 are diodes for average pressure used to provide battery multipled for average voltage, can be disposed on it when needed, because switch member which is serialized between battery units can further connect to CCU and input unit and output voltage current inspection member to form continual adjustment or output voltage and current control between said graded voltage. In this kind of design, we can further dispose electric-mechanic switch contact on both sides of solid switch member to form SSU101–SSU105. By means of following operation order, it can reduce voltage drop, loss, and heat; the operation order of this circuit is as follows:

At "on" position, the (on) operation of solid switch is before electric-mechanic switch.

At "off" position, the (off) operation of solid switch is after electric-mechanic switch.

Figure 5:
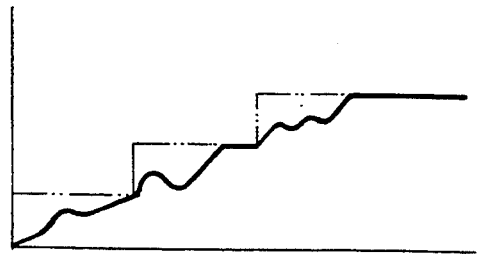
FIG. 5 is a view of linear adjustment voltage wave and graded basic voltage of solar battery multi-voltage.

When solid switch is used as linear control or PWM switch control, electric-mechanic switch which is serialized to it will not operate; said solid switch and electric-mechanic switch can be controlled by CCU, or manually, or electric-magnetically, or mechanically, or fluid dynamically controlled, switch operation situation further comprises:

By controlling electric-mechanic switch, it enables output to surplus the needed output value, and then CCU controls driven current of each linear solid switch member, or by means of control over the battery unit which has higher potential grade between mutually serialized and multiplized battery units, it provides basic voltage of battery units mutually serialized to solid switch member of resistance so as to attain linear output voltage adjustment. Referring to FIG. 5, if the adjustment of a large voltage of a voltage potential grade is needed, electric-mechanic switch can achieve it so that heat loss will be less;

By operating electric-mechanic switch, it enables the output surplus the needed output value, and then CCU controls it and each solid switch member outputs chopped current, or controls driven current of each linear solid switch member, or by means of control over the battery unit which has higher potential grade between mutually serialized and multiplized battery units, it provides basic voltage of battery units mutually serialized to solid switch member of driven pulse range so as to attain average output voltage adjustment. For example, CCU controls SSU 101, 102, 104, 105, which are all mutually connected and SSU 103 is controlled by chopped wave and its output is as following FIG. 6, if we want to trim the adjustment of a large voltage larger than a unit of battery units voltage potential grade, we can do it by means of electric-mechanical switch unit, because it has graded basic voltage, ripple-wave value is lower than that of ave-loaded adjustment of the whole voltage directly;

"If said linear or chopped wave control ripple range and graded basic voltage are composed of battery unit of equal voltage, in order to seek an average of electric consumption, CCU can further be used to control unit CCU which periodically alternates to control its solid switch member so as to make battery alternate basic voltage supply and adjusting range, or chopped wave pulse to have an average electric consumption."

We can further serialize an inspection device CT100 to the output circuit so as to inspect its output current value feeding back to central control unit (CCU), according to the input unit instruction or the preset value in CCU, and control mutually and relatively electric-mechanical switch and solid switch, and at the output terminal it multiplized inspection device VT100 so as to inspect its output voltage value which feeds back to CCU, and in accordance with instructions of input unit, or with the mutual control of solid switch and electric-mechanical switch of preset value in CCU. Similar to the conventional steady voltage circuit, because this circuit has a standard potential, in addition to adjusting the voltage change caused by unsteady load, it can adjust loaded side voltage change caused by unsteady power voltage.

Besides, said switch member still functions as a switch and add a serialized SSS100 to the circuit and functions as a constant adjusting component between graded voltage of linear and chopped wave control; that is, "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output or slowly voltage-rising or slowly dropping, which forms between valley bottom voltage and peak and is controlled by adjustable linear, or PWM of it".

Figure 7:
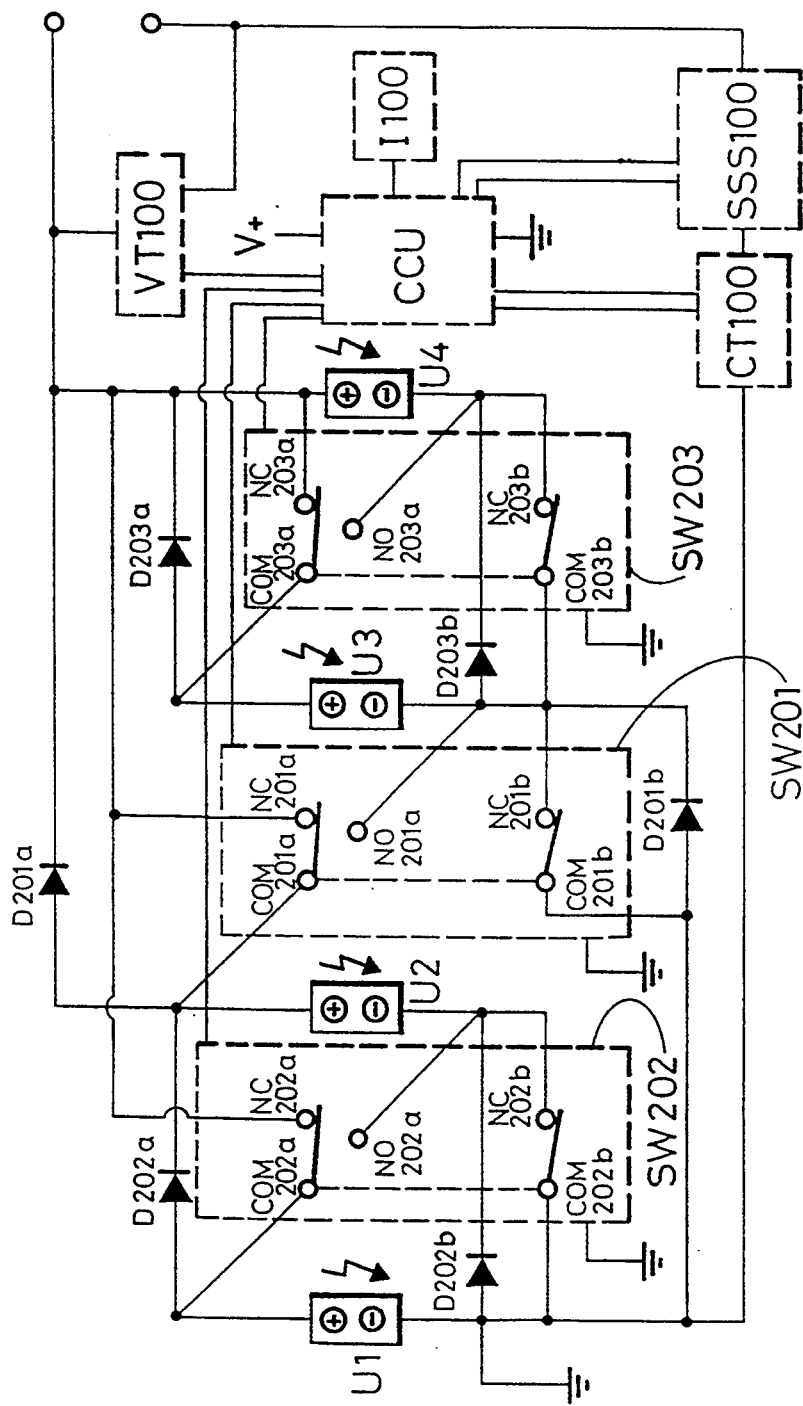
FIG. 7 is a view of solar battery multi-voltage circuit composed of branch switch circuit and serial diode.

Another application of said circuit is shown in FIG. 7, an embodiment of serialized multi-voltage circuit, it consists of two sets or more than two sets of battery units of same voltage, same capacity, or at least of same voltage, and by means of branch connected switches to switch on/off and change their serialized and multiplized situation so as to further charge their output voltage; when outputting, it will make switch contact multiple series connect to segmented diode's two ends so as to eliminate diode's direct voltage reducing and thermal loss, and it can further combine with current inspection device and linear or switch-mode solid switch member, and combine with a central control unit (CCU) to accept operation order of input device instruction so as to control electric-mechanical switch and solid switch member for adjusting the output voltage, or set the limits of output current value, and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/negative polar on/off switch of output side.

Figure 8:
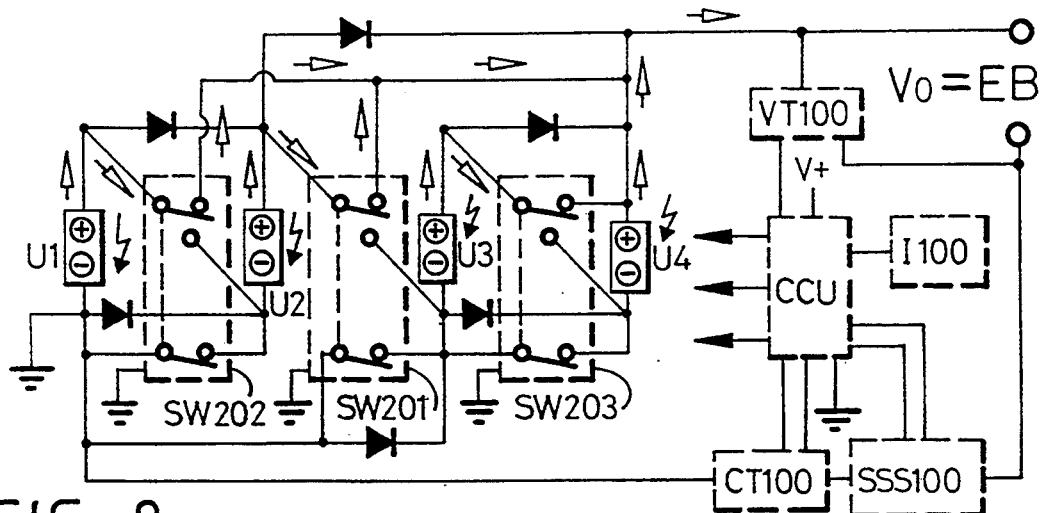
FIG. 8 is a view of low voltage switch circuit of FIG. 7.
Figure 9:
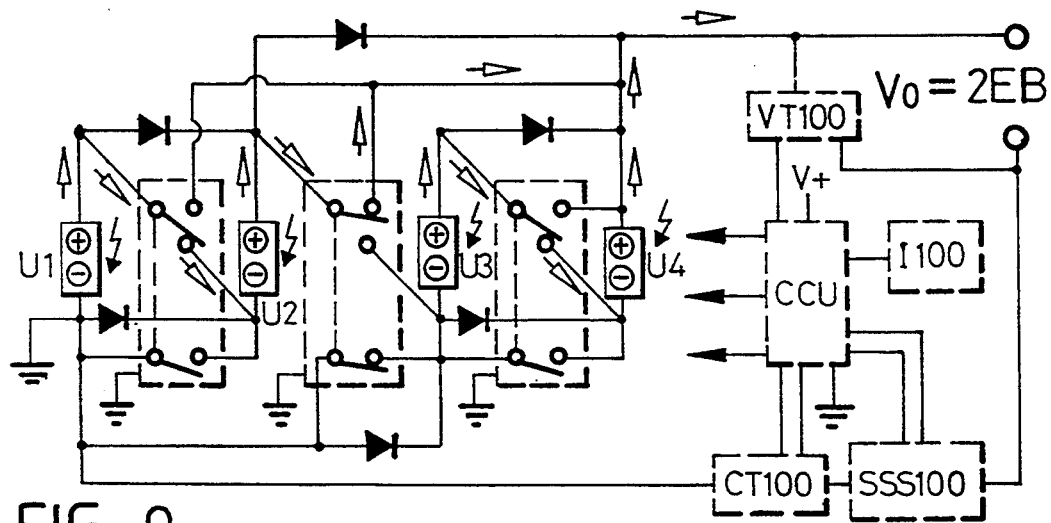
FIG. 9 is a view of intermediate voltage switch circuit of FIG. 7.
Figure 10:
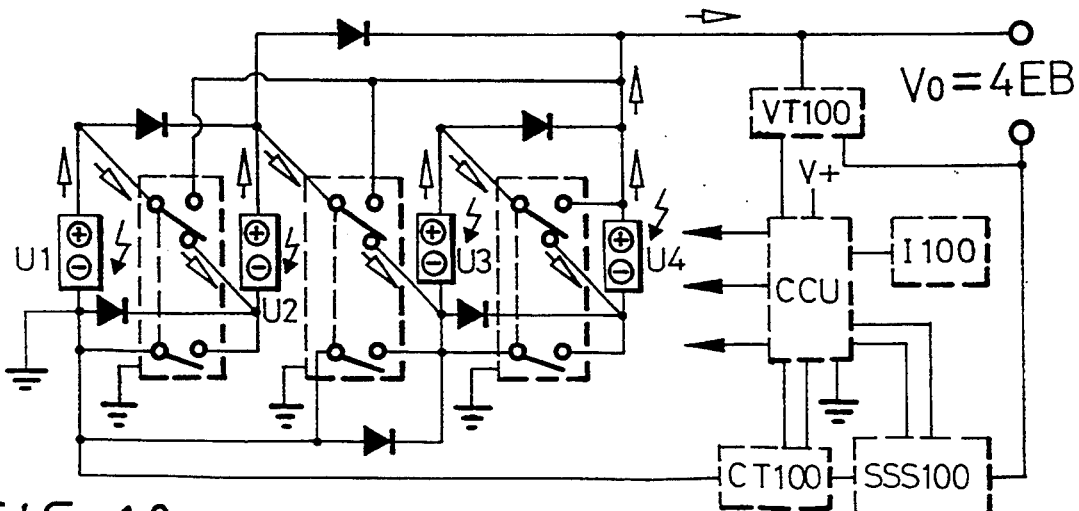
FIG. 10 is a view of high voltage switch circuit of FIG 7.
Figure 12:
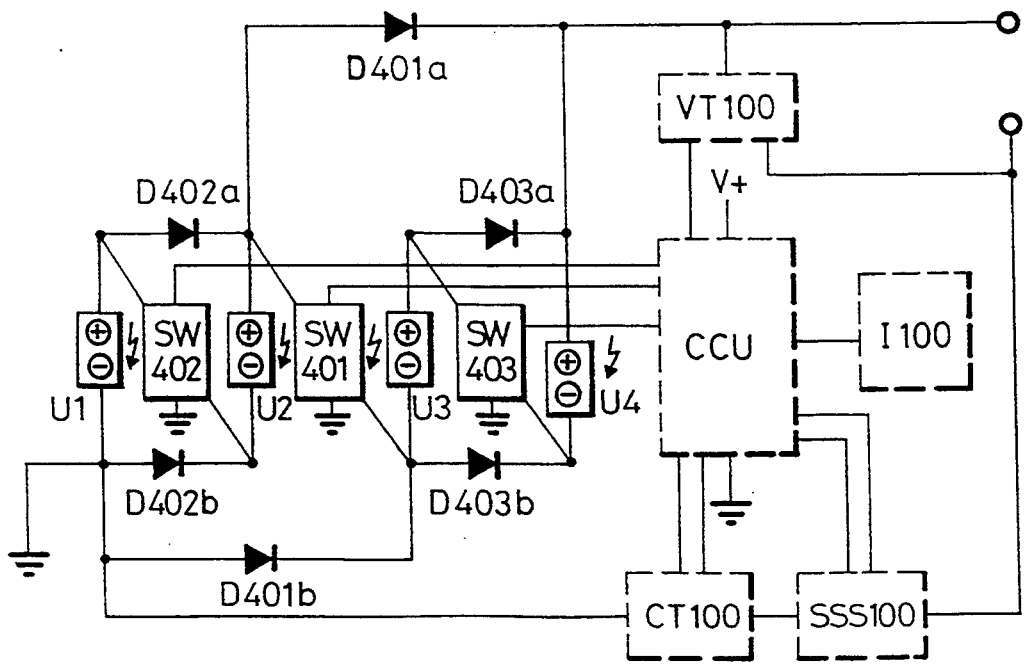
FIG. 12 is a view of solar battery multi-voltage switch circuit composed of solid switch member.

The embodiment in FIG. 7 consists of:

Positive terminal of first solar battery unit U1 and serialized first switch SW202 have first common contact COM202a, after mutually contacted, they directly serialize first diode D202a, and then connect with the positive terminal of solar battery unit U2, and first common contact COM201a of serialized second switch SW201, and then further directly serialize with third Diode D201a, and then connect to output positive terminal;

Negative terminal of first solar battery unit U1 connects to output negative end and serialized first switch SW202 of the second common contact COM202b, and then directly serialized second diode D202b; the output positive terminal of second diode D202b further connects to the open No. 202a of first switch SW202 and second close NC 202b, when common connected to pass to negative of U2;

Negative terminal of first of solar batter unit U1 connects to serialize the common contact switch CM201b of second switch SW201, and then directly serialized diode D201b, the output positive end of diode D201b connects to close contact second NC 201b of second switch SW201 and open first NO201a and second common contact COM203b of serialized third switch SW203 and the negative terminal of third solar battery unit U3; and then directly serialize fifth diode D203b; the output positive terminal of diode D203b connects to second close contact NC 203b of third switch SW203 and the negative terminal of fourth solar battery unit U4;

After the positive terminal of third solar battery U3 connects with first common contact COM203a of serialized third switch SW203, they directly connect to serialized sixth diode D203a; the output positive end of diode D203a connects with first close contact NC203a of serialized switch third SW203 and the positive terminal of fourth solar battery unit U4, and connects to output positive end;

First close contact C202a of serialized switch Sw202 and first close contact NC201a of serialized switch SW201 are connected to output positive end;

Said circuit control has the following characteristics:

1. When SW201, SW202, SW 203 do not operate, solar battery unit U1–U4 connect with switch contact and tend to output low voltage of multiple; that is, 1×battery unit voltage, as shown in FIG. 8, which is partly a circuit view of low voltage output situation in FIG. 7.
2. When SW202, SW 203 are in operation, battery unit U1 serializes with U2, U3 serializes with U4, and then these two are multiplized to output voltage of 2'×battery unit voltage, as shown in FIG. 9, which is a view of output circuit situation of circuit 2'×battery voltage in FIG. 7.
3. When SW201, SW202, SW203 are in operation, battery unit U1–U4 are serialized so as to output voltage of 2"×battery unit voltage, FIG. 12 is a view of output circuit situation of circuit 2"×battery voltage in FIG. 7.

By means of the said circuit in the embodiment, we can use common divisor to make an analog and promote it. One of the characteristics of this circuit is to conduct the multiple devices for diode and contact, to produce sparkle of switching voltage potential differences at two ends of contact grades when contact is switched, and to eliminate diode to directly drop voltage and heat loss.

Figure 11:
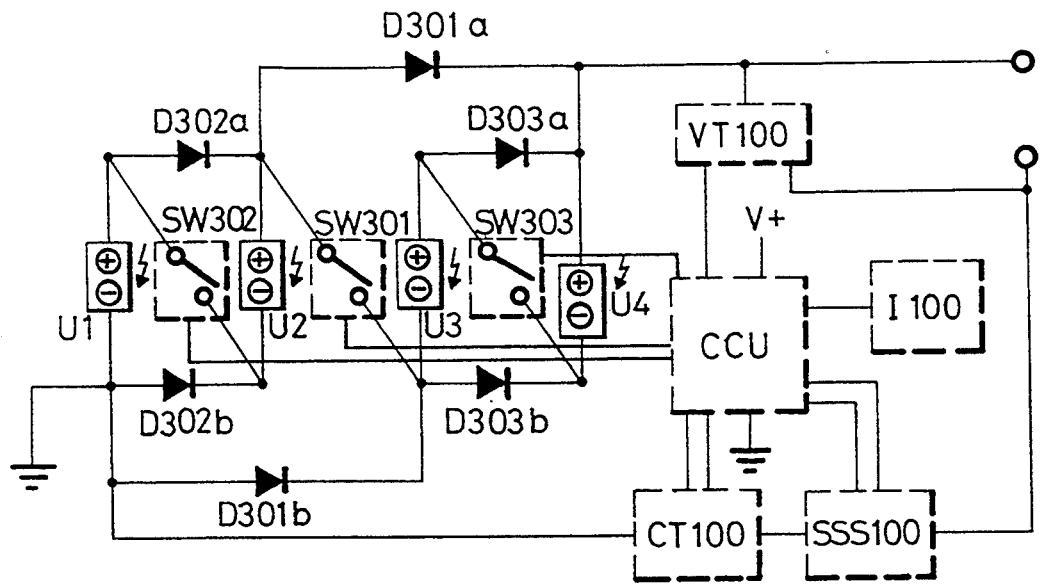
FIG. 11 is a view of solar battery multi-voltage switch circuit of single-throw switch combining with diode.

FIG. 11 is a view of multi-voltage switch circuit of single-throw switch combining with diode, and it can further combine with current inspection device and linear or switch-mode solid switch member, and combine with a central control unit (CCU) to accept operation order of input device instruction so as to control electric-mechanical switch and solid switch member for adjusting the output voltage, or set the limits of output current value, and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/negative polar on/off switch of output side; in this embodiment, circuit shown in FIG. 7 combines with current inspection device and linear, switching, solid switch member and combines with a central control unit CCU, and changes SW201, SW202, SW203 into single-polar open switch and multiples respectively from SW301 to the positive pole of battery unit U1 and negative pole of U2, from SW303 multiple connecting to positive pole of U3 and negative pole of U4 of battery unit; diodes D301a, D301b, D302a, D302b, D303a, D303b are the same as the connecting line in FIG. 7, except the serialized switch can not eliminate the direct drop voltage of diode, all other functions are also the same as the circuit shown in FIG. 7.

We can further use linear and switching solid switch member SW401, SW402, SW403, to replace said switch 8W301, SW302, SW303.

Referring to FIG. 12, a view of solar battery multi-voltage switch circuit composed of solid switch member, the disposition and function of diodes D401a, D401b, D402a, D402b, D403a, D403b are the same as the circuit in FIG. 7 and FIG. 11, the switch function of this circuit is the same as that in FIG. 11.

Figure 6:
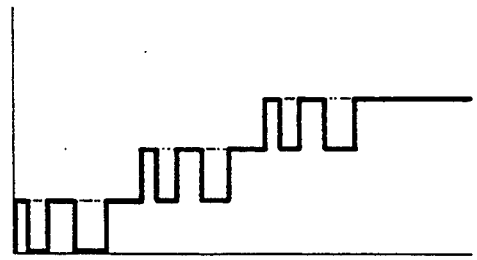
FIG. 6 is a view of chopped-wave adjustment voltage wave and graded basic voltage of solar battery multi-voltage.

Besides, in practical application, said solid switch member still functions as a switch and add a serialized SSS100 to act, as illustrated in FIG. 5, or FIG. 6, and functions as a constant adjusting switch member between linear, and chopped-wave control graded voltage.

According to each said application theory, in practical uses, switch member between each solar battery unit can also use electric-mechanic switch and solid switch member in accordance with needed function and economy.

In conclusion, object of the present invention of Solar Battery Control Switch Output Voltage Adjustment Circuit is to provide an effective newly designed circuit which can output graded multi-voltage, and further combine with linear or chopped solid switch member so as to attain series and parallel switch to adjust its output value when the voltage changes because of accepting solar quality changes or attain the non-sparkle multi-voltage switching and low ripple-wave PWM voltage output of graded linear or chopped wave and further feedback the limited current or set voltage output adjustment function, it is so unique, newly designed, and practical, please examine it in accordance with the law.

I claim:

1. A solar battery control switch output voltage adjustment circuit comprising at least six substantially identical solar batteries, including first, second, third, fourth, fifth and sixth solar batteries, which are interconnected by a central control unit for connecting the solar batteries in a series and parallel arrangement for providing an output voltage on a pair of output terminals having a required load in a wide range of output voltages, the output terminals including positive and negative output terminals, respectively, each solar battery having respective positive and negative terminals and a terminal voltage, said circuit further comprising five double pole double throw switches, including a first switch between the negative terminal of the first solar battery and the positive terminal of the second solar battery, a second switch between the negative terminal of the second solar battery and the positive terminal of the third solar battery, a third switch between the negative terminal of the third solar battery and the positive terminal of the fourth solar battery, a fourth switch between the negative terminal of the fourth solar battery and the positive terminal of the fifth solar battery, and a fifth switch between the negative terminal of the fifth solar battery and the positive terminal of the fifth solar battery, each switch having first and second common contacts, first and second normally closed contacts, and first and second normally opened contacts, respectively, and means for connecting the first common contact to the second normally closed contact, and the second common contact to the first normally closed contact, such that when at least one of said five switches is actuated by the central control unit, the respective common contacts of said at least one switch are connected to respective normally opened contacts of said at least one switch, or to respective normally closed contacts, and when at least one of said five switches is in normal position, the respective common contacts are connected to respective normally closed contacts, the first normally opened contacts of said five switches being connected to ground, and the second normally opened contacts of said five switches being connected to the positive terminal of the pair of output terminals, five pairs of diodes, each pair having first and second diodes, each of the diodes having respective positive and negative terminals, each pair of the diodes being connected to each of said five switches such that the first diode is connected by its negative terminal to the first normally opened contact and by its positive terminal to the first common contact, and the second diode is connected by its negative terminal to the second common contact and by its positive terminal to the second normally opened contact the negative terminals of all respective first diodes being connected to ground, and the positive terminals of all respective second diodes being connected to the positive terminal of the pair of the output terminals, wherein in the normal position of the respective first, second, third, fourth, and fifth switches, the respective first, second, third, fourth, fifth and sixth solar batteries are in parallel, and output voltage is the terminal voltage of each solar battery; wherein, when the second and the fourth switches are actuated, the first and the second solar batteries, the third and the fourth solar batteries, and the fifth and the sixth solar batteries, respectively, are connected in series and the series-connected first and second solar batteries are in parallel with the series-connected third and fourth solar batteries, and are in parallel with the series-connected fifth and sixth solar batteries, and the output voltage is twice the terminal voltage of each solar battery; wherein, when said five switches are actuated, the respective first, second, third, fourth, fifth and sixth solar batteries are connected in series, and the output voltage is six times the terminal voltage of each solar battery.

2. A solar battery control switch output voltage adjustment circuit of claim 1, wherein the switches are made as solid state switches functioning as two pole two throw switches.

3. A solar battery control switch output voltage adjustment circuit comprising at least four solar batteries of substantially equal voltage and including first, second, third and fourth solar batteries, respectively, each of the solar batteries having a substantially equal terminal voltage and each of the solar batteries having respective positive and negative terminals, a plurality of switches including a first switch between the first and second solar batteries, a second switch between the second and third solar batteries, and a third switch between the third and fourth solar batteries, respectively, each of the switches having first and second common contacts, first and second normally closed contacts, and a normally opened contact, respectively, such that when each switch is actuated, the respective normally closed contacts are opened, and such that the respective first common contact is connected to the respective normally open contact, a plurality of diodes including first, second, third, fourth, fifth and sixth diodes, respectively, each of the diodes having a respective positive and negative terminals, a pair of output terminals including a positive output terminal and a negative output terminal, respectively, means for connecting the positive terminal of the first solar battery to the first common contact of the first switch and to the negative terminal of the first diode, respectively, means for connecting the negative terminal of the first solar battery to the negative terminal of the second diode, to the second common contact of the first switch, to the second common contact of the second switch, to the negative terminal of the fourth diode, and to the common output terminal, respectively, means for connecting the positive terminal of the second solar battery to the positive terminal of the first diode, to the negative terminal of the third diode, and to the first common terminal of the second switch, respectively, means for connecting the negative terminal of the second battery to the normally open contact of the first switch, to the positive terminal of the second diode, and to the second normally closed contact of the first switch, respectively, means for connecting the positive terminal of the third solar battery to the negative terminal of the fifth diode and to the common contact of the third switch, respectively, means for connecting the negative terminal of the third solar battery to the normally open contact of the second switch, to the negative terminal of the sixth diode, to the second normally closed contact of the second switch, to the second common contact of the third switch, and to the positive terminal of the fourth diode, respectively, means for connecting the positive terminal of the fourth solar battery to the first normally closed contact of the third switch, to the positive terminal of the fifth diode, to the first normally closed contact of the second switch, to the first normally closed contact of the first switch, to the positive output terminal of the third diode, and to the positive output terminal, respectively, means for connecting the negative terminal of the fourth solar battery to the normally open contact of the third switch, to the positive output terminal of the sixth diode, and to the second normally closed contact of the third switch, respectively; wherein in the normal position of the respective first, second and third switches, the respective first, second third and fourth solar batteries are in parallel, and the voltage at the output terminals is the terminal voltage of each solar battery; wherein, when the first and third switches are actuated, the first and second solar batteries are connected in series, the third and fourth batteries are connected in series, the series-connected first and second solar batteries are in parallel with the series-connected third and fourth solar batteries, and the voltage at the output terminals is twice the terminal voltage of each solar battery; and wherein, when the first, second and third switches are actuated, the first, second, third and fourth solar batteries are all in series, and the voltage at the output terminals is four times the terminal voltage of each solar battery.

* * * * *